(12) United States Patent
Yokosato et al.

(10) Patent No.: US 7,191,370 B2
(45) Date of Patent: Mar. 13, 2007

(54) DATA TRANSMITTER DEVICE, REPEATER DEVICE, DATA TRANSMISSION/RECEPTION DEVICE, AND DATA COMMUNICATION METHOD

(75) Inventors: Junichi Yokosato, Tokyo (JP); Yoshiaki Kato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 297 days.

(21) Appl. No.: 10/501,160

(22) PCT Filed: Mar. 24, 2003

(86) PCT No.: PCT/JP03/03538

§ 371 (c)(1),
(2), (4) Date: Jul. 13, 2004

(87) PCT Pub. No.: WO03/081853

PCT Pub. Date: Oct. 2, 2003

(65) Prior Publication Data

US 2005/0086576 A1   Apr. 21, 2005

(30) Foreign Application Priority Data

Mar. 27, 2002   (JP) ............................. 2002-088117

(51) Int. Cl.
*G01R 31/28* (2006.01)
*G01R 31/08* (2006.01)
*H04L 12/26* (2006.01)
*H04J 3/16* (2006.01)
*G06F 11/00* (2006.01)

(52) U.S. Cl. ................. 714/712; 370/235; 370/470
(58) Field of Classification Search ............... None
See application file for complete search history.

(56) References Cited

U.S. PATENT DOCUMENTS 6,172,972 B1 * 1/2001 Birdwell et al. ............ 370/349
7,031,343 B1 * 4/2006 Kuo et al. .................. 370/473

FOREIGN PATENT DOCUMENTS

| JP | 01-197144 A | 8/1989 |
| JP | 7-321847 A | 12/1995 |
| JP | 10-145341-1 | 5/1998 |
| JP | 10-145341 A | 5/1998 |
| JP | 10-242946 A | 9/1998 |
| JP | 10-242946 A | 9/1998 |

(Continued)

OTHER PUBLICATIONS

International Search Report dated Jul. 1, 2003 for PCT/JP03/03538.

*Primary Examiner*—Christine T. Tu
(74) *Attorney, Agent, or Firm*—Birch, Stewart, Kolasch & Birch, LLP

(57) ABSTRACT

A data receiver (201) or gateway (203) notifies a data transmitter (202) of error conditions in the data receiver (201) or gateway (203) via networks 1 (204) and 2 (205). According to the error conditions, the data transmitter (202) transmits data at a packet length corresponding to the error rate even for the higher level protocol common the networks 1 (204) and 2 (205), as well. Thus, the fraction of packets lost can be reduced in the higher level protocol common to the networks 1 (204) and 2 (205).

8 Claims, 15 Drawing Sheets

FOREIGN PATENT DOCUMENTS

| | | |
|---|---|---|
| JP | 11-46186 A | 2/1999 |
| JP | 11-046186 A | 2/1999 |
| JP | 11-331175 A | 11/1999 |
| JP | 11-331175 A | 11/1999 |
| JP | 11-331234 A | 11/1999 |
| JP | 11-355253 A | 12/1999 |
| JP | 2001-086190 A | 3/2001 |
| JP | 2001-160824 A | 6/2001 |
| JP | 2001-168914 A | 6/2001 |
| JP | 2001-197144 A | 7/2001 |

\* cited by examiner

| | 1201 |
|---|---|
| TIME 1 | FRACTION 1 OF PACKETS LOST |
| TIME 2 | FRACTION 2 OF PACKETS LOST |
| TIME 3 | FRACTION 3 OF PACKETS LOST |
| ⋮ | ⋮ |
| TIME n | FRACTION n OF PACKETS LOST |
| ⋮ | ⋮ |

FIG.10
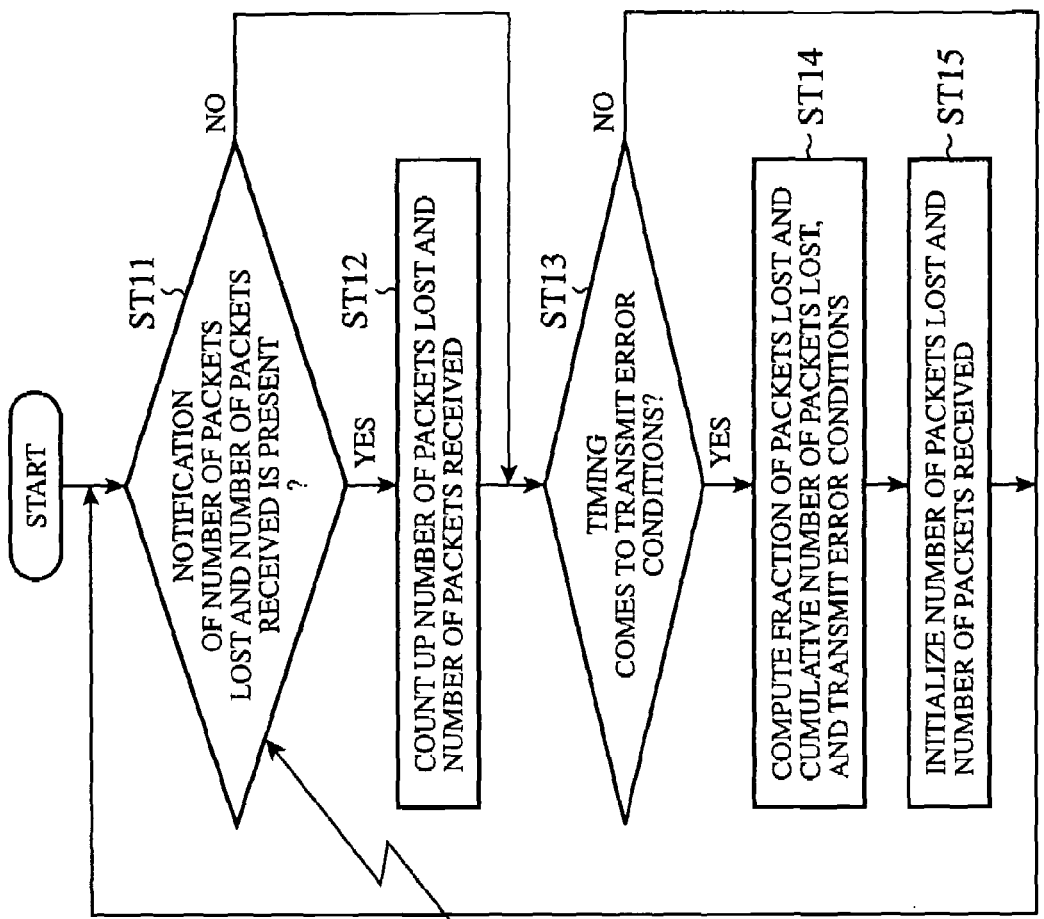
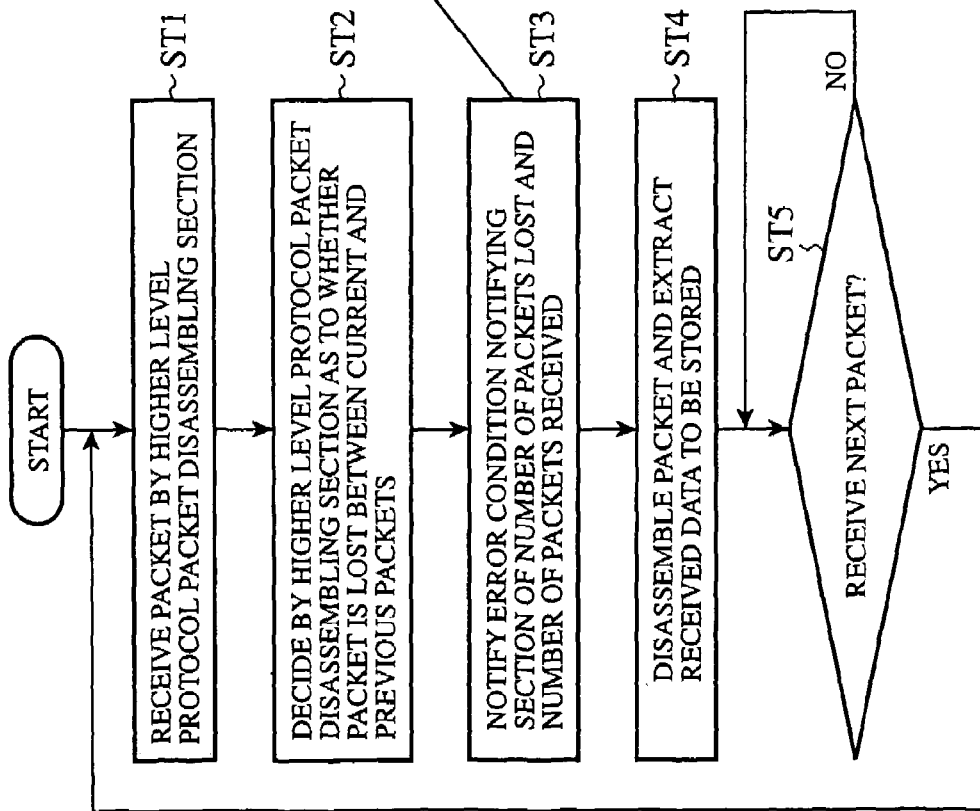

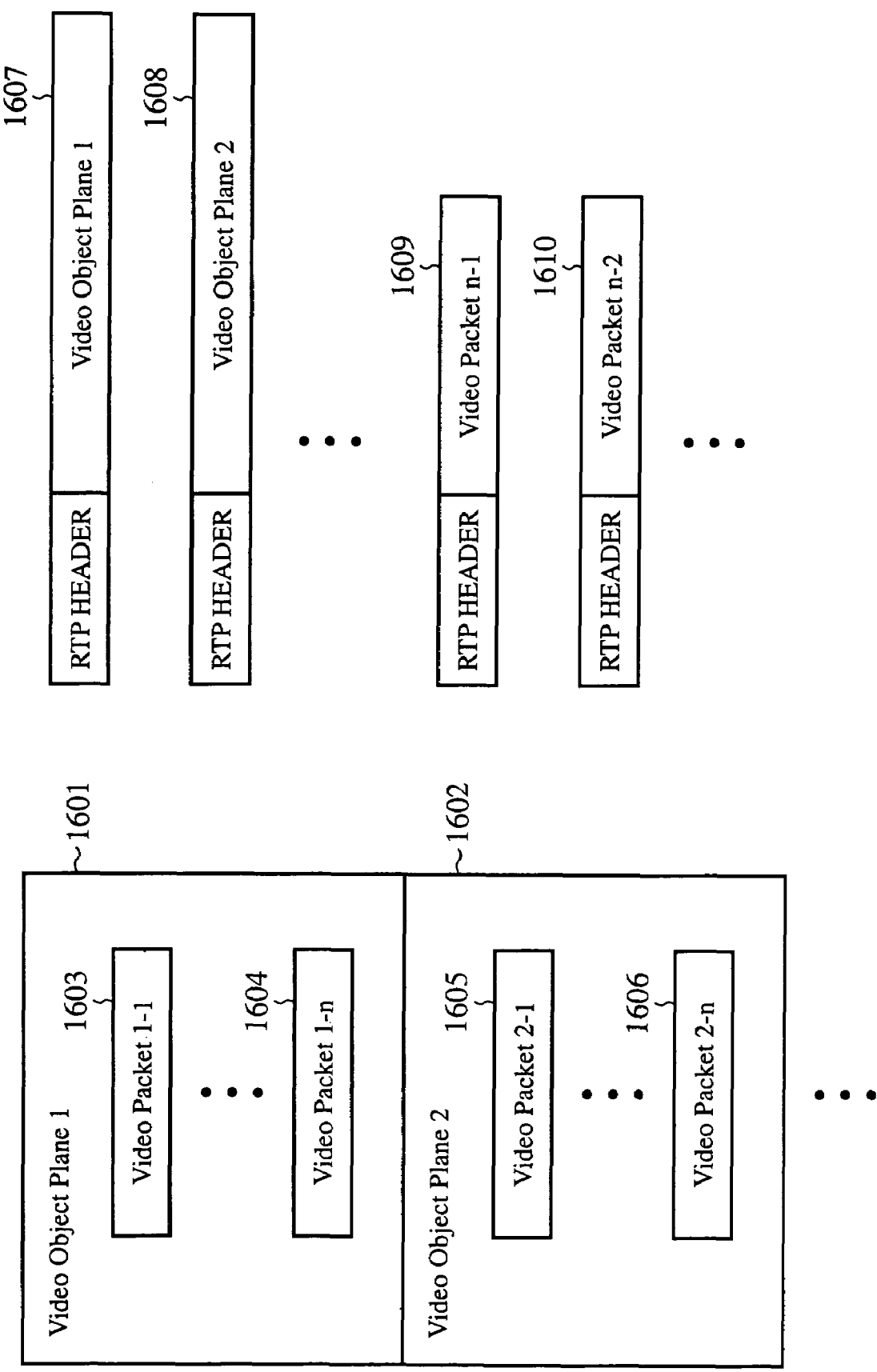

DATA TRANSMITTER DEVICE, REPEATER DEVICE, DATA TRANSMISSION/RECEPTION DEVICE, AND DATA COMMUNICATION METHOD

TECHNICAL FIELD

The present invention relates to a data transmitter, gateway, data transceiver and data communication method capable of providing communication adaptable to error conditions varying during data communication between transceivers via networks whose error conditions are variable.

BACKGROUND ART

FIG. 1 shows a conventional data transceiver system disclosed in Japanese patent application laid-open No. 11-331234. In the data transceiver system, a radio terminal unit conducts data transmission and reception to and from an application server as follows. The radio terminal unit or base station notifies a gateway server of circuit conditions in a radio section, and the gateway server adjusts parameters such as packet length and retransmission duration when converting to a radio protocol, thereby carrying out the data communication.

The conventional data communication system disclosed in Japanese patent application laid-open No. 11-331234 transmits data after the gateway converts into the radio network protocol using parameters (packet length, retransmission timer, and window size) suitable for the circuit conditions of the radio network.

In an ordinary video and audio multimedia communication, however, there are different level protocols: a lower level protocol different on the radio and the Internet sections; and a higher level protocol common to the radio and the Internet sections for enabling streaming communication. The foregoing conventional data communication system enables transmission and reception according to the parameters matching to the error characteristics of the networks according to only the lower level protocols, thereby being unable to conduct the transmission at an appropriate packet length according to the higher level protocol.

The present invention is implemented to solve the foregoing problem. Therefore it is an object of the present invention to provide a data transmitter, gateway, data transceiver and data communication method capable of reducing the fraction of packets lost by receiving data at a packet length adaptable to the error conditions of the networks even according to the common higher level protocol.

DISCLOSURE OF THE INVENTION

According to a first aspect of the present invention, there is provided a data transmitter for carrying out data communication with a data receiver via a plurality of networks with different characteristics using a higher level protocol common to the plurality of networks and a lower level protocol inherent in each of the plurality of networks, wherein the data transmitter receives error occurrence conditions in the networks from the data receiver, and variably controls a packet length of the higher level protocol common to the plurality of networks in response to the error occurrence conditions in the networks. Thus, it can vary the packet length not only of the lower level protocol, but also of the protocol common to the networks in response to the conditions of the networks. As a result, it can carry out communication efficiently in the network with a small number of errors, and effectively in the network with a large number of errors with preventing the adverse effect of the errors as much as possible.

The data transmitter may be characterized in that when it variably controls the packet length of the higher level protocol common to the plurality of networks in response to the error occurrence conditions in the networks, it variably adjusts the packet length of the higher level protocol in accordance with to a structure and characteristics of data to be transmitted.

According to a second aspect of the present invention, there is provided a gateway for repeating data communication between a data transmitter and a data receiver via a plurality of networks with different characteristics using a higher level protocol common to the plurality of networks and a lower level protocol inherent in each of the plurality of networks, wherein the gateway receives error occurrence conditions in the networks from the data receiver, and variably controls a packet length of the higher level protocol common to the plurality of networks in response to the error occurrence conditions in the networks. Thus, it can vary the packet length not only of the lower level protocol, but also of the protocol common to the networks in response to the conditions of the networks. As a result, it can carry out communication efficiently in the network with a small number of errors, and effectively in the network with a large number of errors with preventing the adverse effect of the errors as much as possible.

The gateway may be characterized in that it variably controls the packet length of the lower level protocol different in each network to a packet length adaptable to the error conditions of each network.

The gateway may be characterized in that the error occurrence conditions in the networks received from the data receiver include error occurrence conditions in the networks transmitted from another gateway at an interface with another network.

According to a third aspect of the present invention, there is provided a data transceiver for carrying out data communication with another data transceiver via a plurality of networks with different characteristics using a higher level protocol common to the plurality of networks and a lower level protocol inherent in each of the plurality of networks, wherein the data transceiver extracts error occurrence conditions in the networks when receiving data from the another data transceiver, and variably controls a packet length of the higher level protocol common to the plurality of networks in response to the error occurrence conditions in the networks extracted. Thus, it can vary the packet length not only of the lower level protocol, but also of the protocol common to the networks in response to the conditions of the networks. As a result, it can carry out communication efficiently in the network with a small number of errors, and effectively in the network with a large number of errors with preventing the adverse effect of the errors as much as possible.

According to a fourth aspect of the present invention, there is provided a data communication method of carrying out data communication between a data transmitter and a data receiver via a plurality of networks with different characteristics using a higher level protocol common to the plurality of networks and a lower level protocol inherent in each of the plurality of networks, wherein the data communication method variably controls a packet length of the higher level protocol common to the plurality of networks in response to error occurrence conditions in the networks. Thus, it can vary the packet length not only of the lower level protocol, but also of the protocol common to the networks in response to the conditions of the networks. As a result, it can carry out communication efficiently in the network with a small number of errors, and effectively in the network with a large number of errors with preventing the adverse effect of the errors as much as possible.

BRIEF DESCRIPTION OF THE DRAWINGS

FIG. 10 is a flowchart illustrating the procedure of generating error condition data in the data receiver 201 of the embodiment 1;

FIG. 17 is a schematic diagram illustrating an example for transmitting MPEG-4 video data according to the RTP in the embodiment 4.

BEST MODE FOR CARRYING OUT THE INVENTION

The best mode for carrying out the invention will now be described with reference to the accompanying drawings to explain the present invention in more detail.

Embodiment 1

Figure 1:
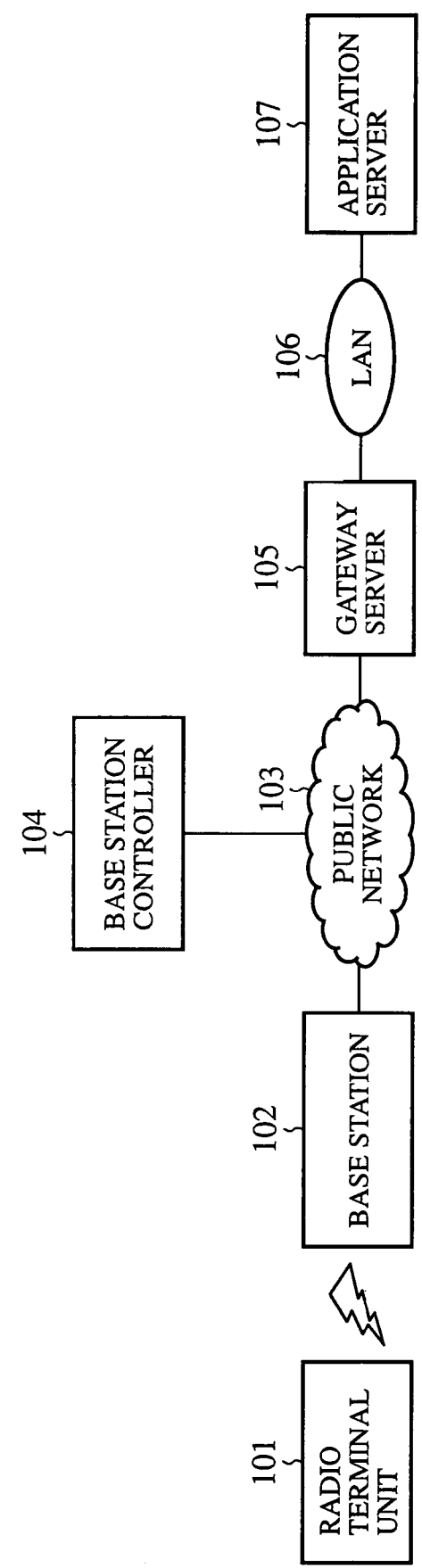
FIG. 1 is a block diagram showing a configuration of a conventional example disclosed in Japanese patent application laid-open No. 11-331234.
Figure 2:
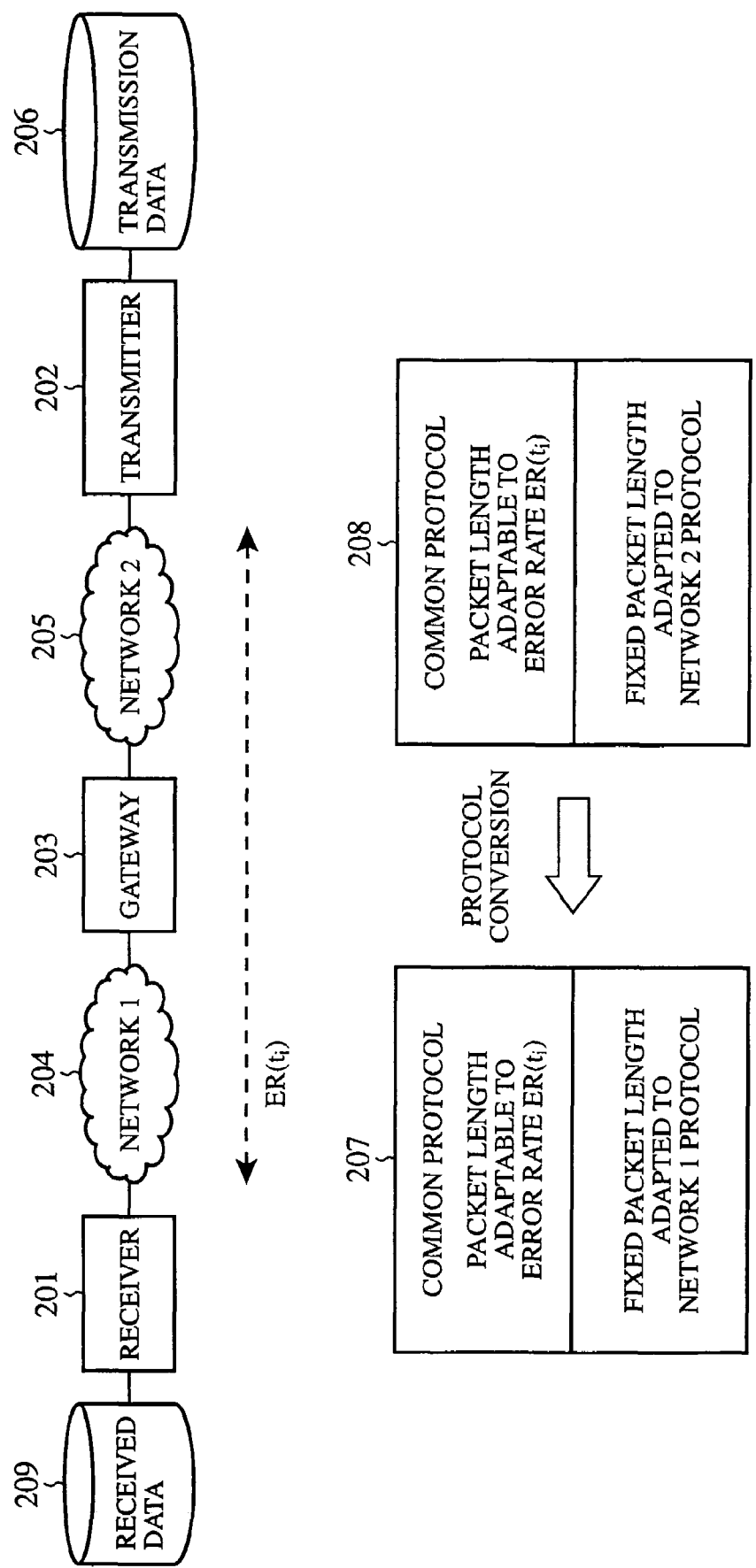
FIG. 2 is a schematic diagram showing a basic configuration of a data transceiver system of an embodiment 1 in accordance with the present invention.

FIG. 2 is a schematic diagram showing a basic configuration of a data transceiver system of an embodiment 1 in accordance with the present invention, which carries out the data transmission and reception via two networks with different characteristics. In FIG. 2, the reference numeral 201 designates a data receiver (shortened to "receiver" in the drawing); 202 designates a data transmitter (shortened to "transmitter" in the drawing); 203 designates a gateway; 204 designates a network 1; 205 designates a network 2; 206 designates transmission data; 207 designates a protocol stack for transmitting the transmission data 206 via the network 1; 208 designates a protocol stack for transmitting the transmission data 206 via the network 2; and 209 designates received data.

The operation of the data transceiver system as shown in FIG. 2 will be described. The data receiver 201 receives the transmission data 206 from the data transmitter 202 via the network 1 (204) and network 2 (205) with different characteristics. The network 1 and network 2 have an error rate varying depending on time or a state and position of the data receiver 201. The total error rate of the network 1 (204) and network 2 (205) for the data receiver 201 at time ti is represented by ER(ti).

The transmission data 206 is transmitted between the data transmitter 202 and data receiver 201 using a protocol common to the networks, which is described in the protocol stacks 208 and 207 as the higher level protocol. In contrast, the transmission data 206 is transmitted through the network 1 using a network 1 protocol described in the protocol stack 207 as the lower level protocol, and through the network 2 using a network 2 protocol described in the protocol stack 208 as the lower level protocol. The conversion of the lower level protocols between the network 1 and network 2 is carried out by the gateway 203 serving as a gateway.

Figure 3:
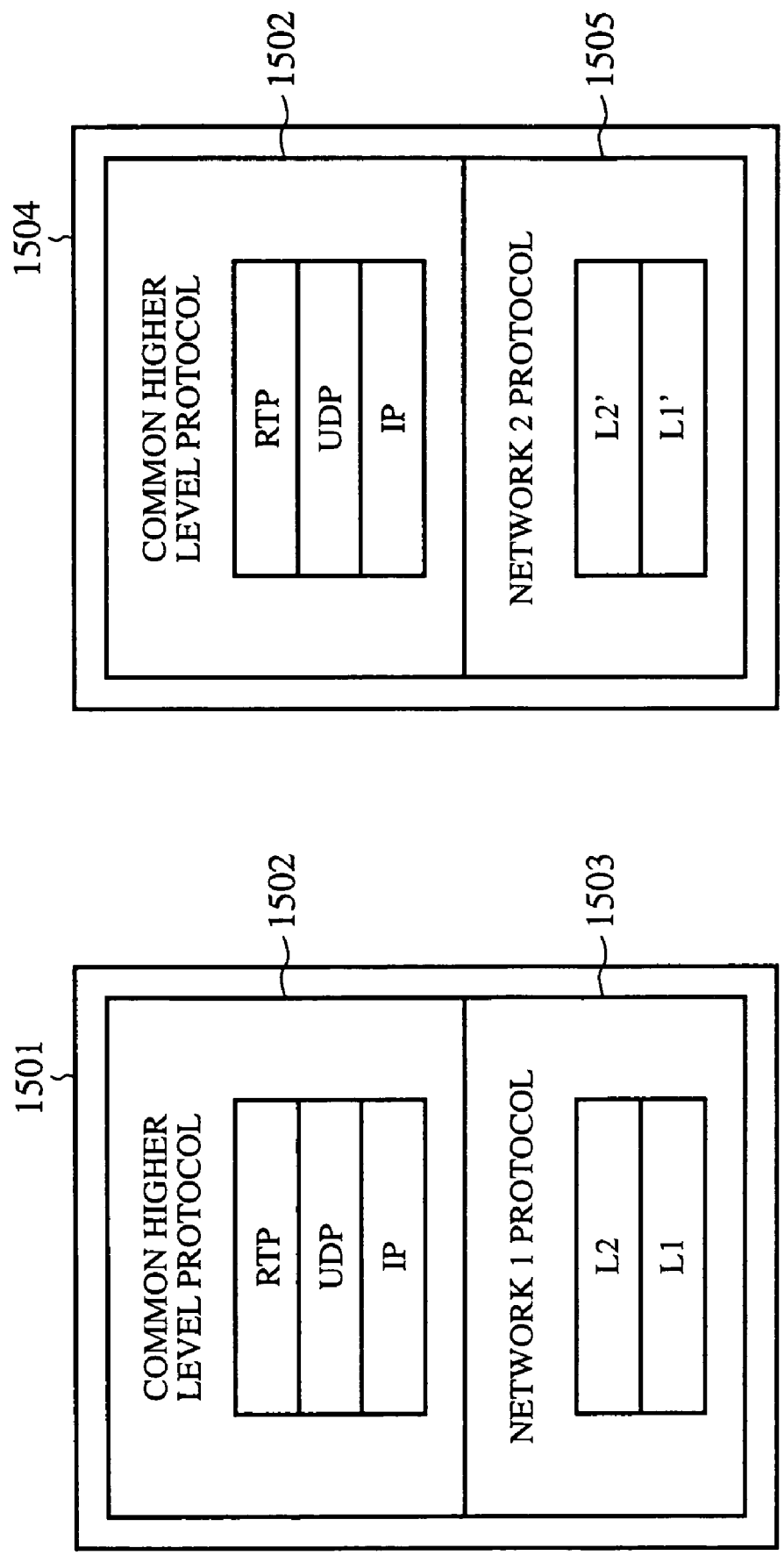
FIG. 3 is a diagram showing examples of a network protocol stack for carrying out communication using an RTP (Real-time Transport Protocol)/UDP/IP as an example of a communication protocol.

FIG. 3 illustrates network protocol stacks for communication using the RTP (Real-time Transport Protocol)/UDP/IP as an example of the communication protocol. In FIG. 3, the reference numeral 1501 designates a protocol stack for carrying out communication via the network 1, and 1504 designates a protocol stack for carrying out communication via the network 2. The reference 1502 designates a higher level protocol common to the network 1 and network 2; 1503 designates a lower level network protocol for the network 1, and 1505 designates a lower level network protocol for the network 2. The gateway 203 carries out the protocol conversion between the lower level network protocol 1503 and lower level network protocol 1505 of the networks 1 and 2.

Next, the configuration and operation of the data transmitter 202 and data receiver 201 will be described separately in more detail.

Description of the Transmitter Side.

Figure 4:
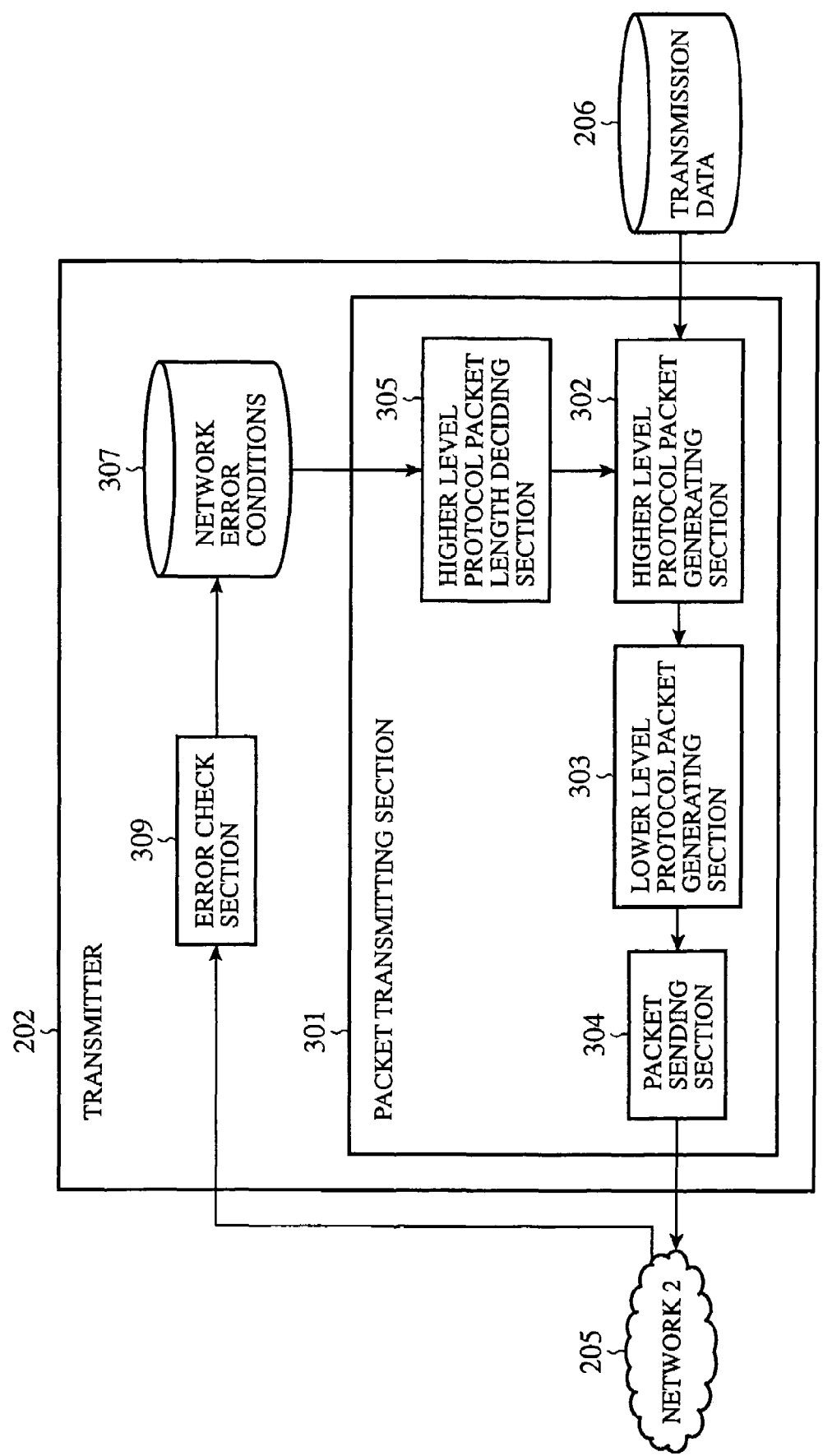
FIG. 4 is a block diagram showing a detailed configuration of the data transmitter 202 of the embodiment 1 as shown in FIG. 2.

FIG. 4 is a block diagram showing a detailed configuration of the data transmitter 202 of the embodiment 1 as shown in FIG. 2. In FIG. 4, the reference numeral 301 designates a packet transmitting section, 302 designates a higher level protocol packet generating section, 303 designates a lower level protocol packet generating section, 304 designates a packet sending section, 305 designates a higher level protocol packet length deciding section, 307 designates network error conditions, 309 designates an error check section, 206 designates the transmission data, 202 designates the transmitter, and 205 designates the network 2.

The operation of the data transmitter 202 as shown in FIG. 4 will be described. The higher level protocol packet generating section 302 in the data transmitter 202 generates a packet with the higher level protocol for transmitting the transmission data 206. As for the length of the packet of the higher level protocol, the higher level protocol packet length deciding section 305 decides it at a packet length adaptable to the error conditions with reference to the data about the network error conditions 307. The packet of the higher level protocol generated is supplied to the lower level protocol packet generating section 303. The packet generated by the lower level protocol packet generating section 303 is supplied to the packet sending section 304 to be transferred to the network 2 (205). As for the network error conditions 307, the error check section 309 collects the error information transmitted from the data receiver 201, and stores in the network error conditions 307.

Figures 5, 6:
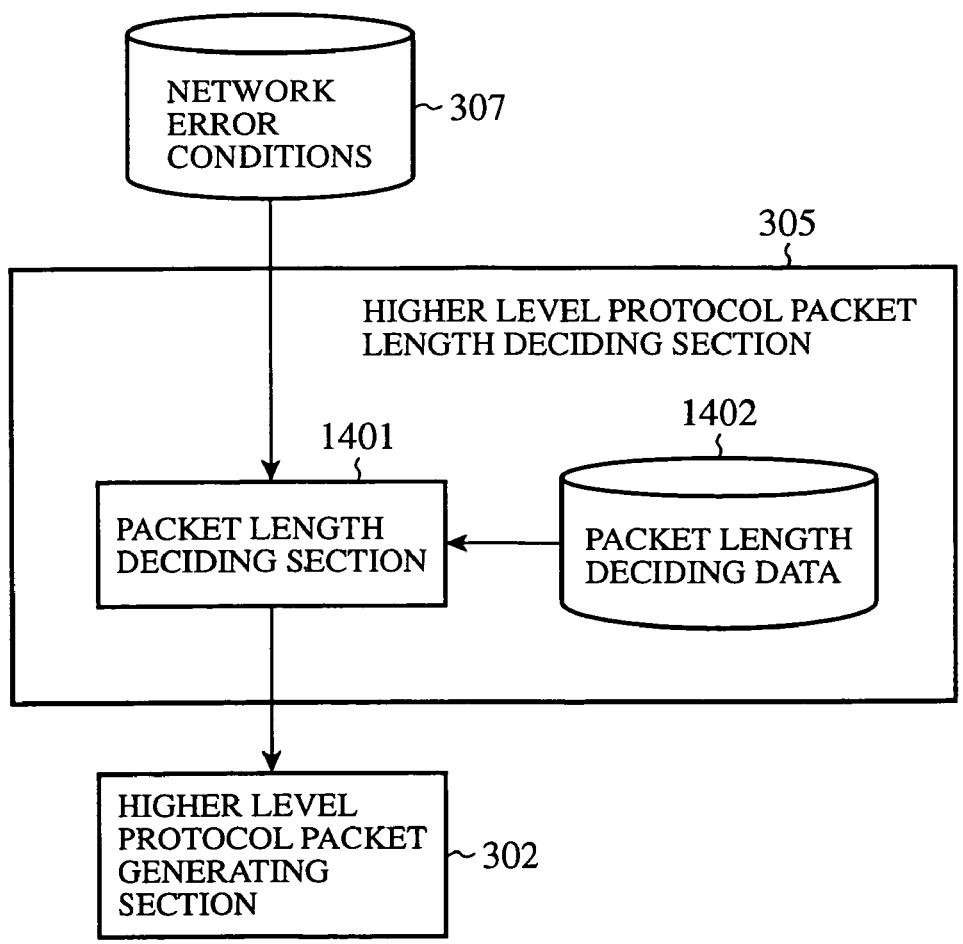
FIG. 5 is a diagram illustrating a data structure of network error conditions.
FIG. 6 is a block diagram showing a detailed configuration of the higher level protocol packet length deciding section 305 shown in FIG. 4.

FIG. 5 is a diagram illustrating a data structure of the network error conditions. In FIG. 5, the reference numeral 1201 designates an example of data representing network conditions. As illustrated in FIG. 5, the network error conditions are represented, for example, by the data about time and fraction of packets lost calculated and stored at each time. The fraction n of packets lost represents the ratio of the number of packets lost from time n−1 to time n to the total number of the packets transmitted during that time period.

FIG. 6 shows a detailed configuration of the higher level protocol packet length deciding section 305 as shown in FIG. 4. In FIG. 6, the reference numeral 1401 designates a packet length deciding section, 1402 designates a packet length deciding data, 305 designates the higher level protocol packet length deciding section, 307 designates the network error conditions, and 302 designates the higher level protocol packet generating section.

The operation of the higher level protocol packet length deciding section 305 as shown in FIG. 6 will be described. The packet length deciding section 1401 in the higher level protocol packet length deciding section 305 reads the network error conditions 307, and decides the packet length to be transmitted. To decide the packet length, the packet length deciding section 1401 reads the packet length deciding data 1402, and retrieves the packet length corresponding to the error conditions of the network. The packet length deciding data 1402 consists of a table having columns representing ranges of network error rates and packet lengths, which enables the packet length deciding section 1401 to search for the range including the current network error rate, and to retrieve the packet length.

Description of Receiver Side.

Figure 7:
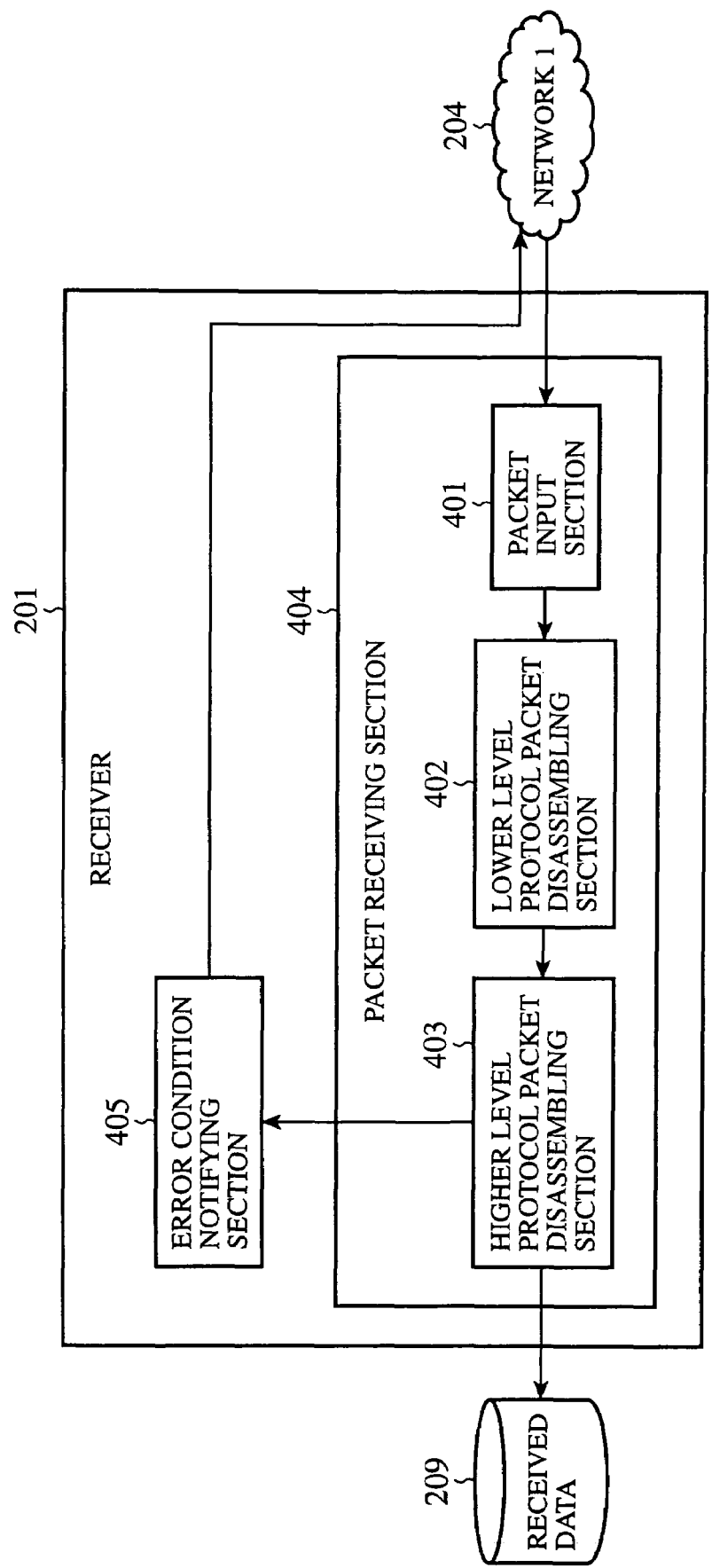
FIG. 7 is a block diagram showing a detailed configuration of the data receiver 201 shown in FIG. 2.

FIG. 7 is a block diagram showing a detailed configuration of the data receiver 201 as shown in FIG. 2. In FIG. 7, the reference numeral 401 designates a packet input section, 402 designates a lower level protocol packet disassembling section, 403 designates a higher level protocol packet disassembling section, 209 designates the received data, and 405 designates the error condition notifying section.

The operation of the data receiver 201 as shown in FIG. 7 will be described. The packet supplied from the network 1 (204) to the packet input section 401 is restored to the data through the lower level protocol packet disassembling section 402 that disassembles the lower level protocol, and the higher level protocol packet disassembling section 403 that disassembles the higher level protocol. Then, the data is stored in the received data 209. The error condition notifying section 405 analyzes the reception condition of the packet at the higher level protocol packet disassembling section 403 to obtain the fraction of packets lost. The error condition notifying section 405 transmits the error conditions to the data transmitter 202.

Figure 8:
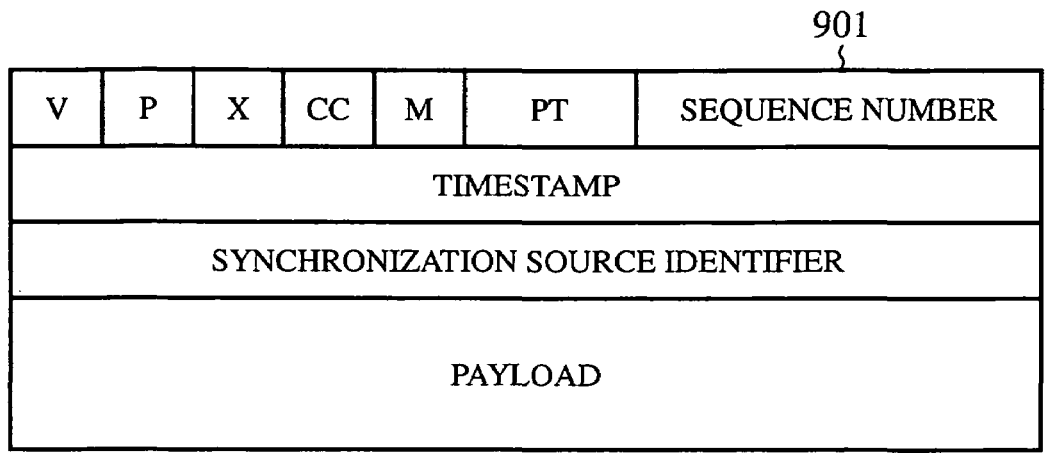
FIG. 8 is a diagram illustrating a packet format 901 of the RTP (Real-time Transport Protocol) as an example of the higher level protocol.

FIG. 8 illustrates a packet format 901 of the RTP (Real-time Transport Protocol) as an example of the higher level protocol. The error condition notifying section 405 obtains the fraction lost of incoming packets to the data receiver 201 from the consecution of the "sequence number" in the RTP packet format. In FIG. 8, V designates a version, P designates a padding flag, X designates an extension flag, CC designates a contributing source (CSRC) count, M designates a marker bit, and PT designates a payload type.

Figure 9:
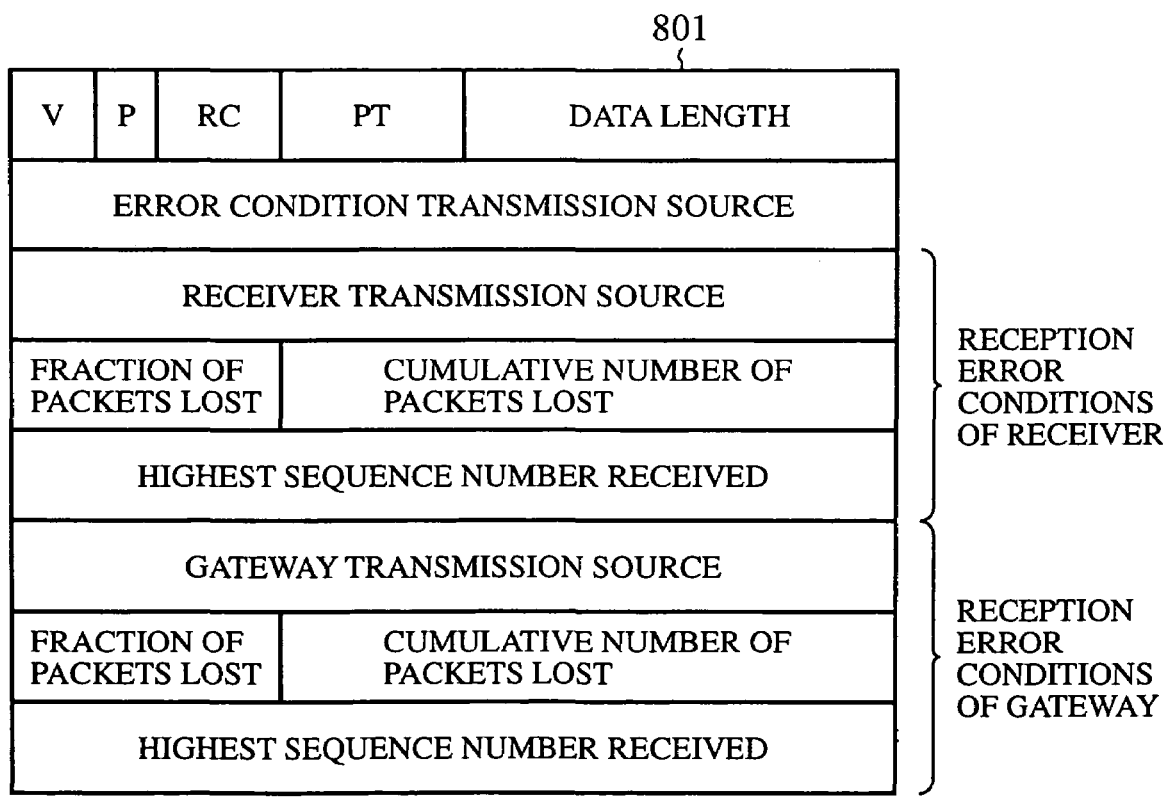
FIG. 9 is a diagram illustrating a packet format (801) of an RTCP (RTP Control Protocol) as an example of a protocol used for error condition communication.

FIG. 9 illustrates a packet format 801 of an RTCP (RTP Control Protocol) as an example of the protocol used for the error condition communication. In FIG. 9, V designates a version, P designates a padding flag, and PT designates a payload type. The error condition notifying section 405 writes information into the "fraction of packets lost" and "cumulative number of packets lost" fields of the RTCP packet format, and transmits them to the transmitter. In this case, the error condition notifying section 405 of the data receiver 201 transmits reception error conditions to the data transmitter 202 by the RTCP packet as illustrated in FIG. 9.

FIG. 10 is a flowchart illustrating the procedure of generating the error condition data in the data receiver 201 of the present embodiment 1. As shown in FIG. 7, when the higher level protocol packet disassembling section 403 receives a packet (step ST1), an RTP packet, for example, the higher level protocol packet disassembling section 403 extracts the sequence number of the packet received (see, FIG. 8). Then, it computes the number of packets lost by comparing the sequence number with the sequence number of the packet previously received (step ST2). It notifies the error condition notifying section 405 of the number of packets lost and the number of packets received (step ST3). Subsequently, it disassembles the packet, extracts and stores the received data (step ST4), and enters a reception standby mode of the next packet (step ST5). Receiving the next packet ("YES" at step ST5), it returns the processing to the foregoing step ST1.

Receiving the notification of the number of packets lost and the number of packets received from the higher level protocol packet disassembling section 403 through the processing at step ST3 ("YES" at step ST11), the error condition notifying section 405 counts up the number of packets lost and the number of packets received (step ST12). When the timing of transmitting the error condition comes ("YES" at step ST13), the error condition notifying section 405 computes, when using the RTCP packet, for example, the fraction of packets lost and the cumulative number of packets lost, sends them to the data transmitter 202 as the error condition data (step ST14), and initializes the number of packets lost and the number of packets received (step ST15).

Thus, the present embodiment 1 is configured such that the data receiver 201 or gateway 203 notifies the data transmitter 202 of the error conditions at the data receiver 201 or gateway 203 via the networks 1 (204) and 2 (205), and that in response to the error conditions, the data transmitter 202 carries out the transmission/reception with the packet length adaptable to the error rate even for the higher level protocol common to the networks 1 (204) and 2 (205). Therefore, the present embodiment 1 can reduce the fraction of packets lost even for the higher level protocol common to the networks 1 (204) and 2 (205).

For example, consider a video transceiver system in which the network 1 is a radio network such as a mobile telephone network, the network 2 is a wired network such as the Internet, the lower level protocols differ in the radio protocol and wired protocol, the higher level uses the RTP/UDP/IP as the common protocol, and the error conditions between the data receiver 201 and the data transmitter 202 are transmitted according to the RTCP/UDP/IP. In addition, assume that the lower level protocol inherent in the radio network is used to send a short packet suitable for the radio network with a greater number of errors, and the lower level protocol inherent to the wired network is used to send the packet length of the higher level protocol to transmit/receive the data efficiently. If the radio conditions of the receiver are degraded and the error rate of the network increases, the receiver notifies the transmitter of the phenomenon using the RTCP. Receiving the error conditions, the transmitter side sends the RTP higher level packet with reducing the packet length. Thus, the present embodiment 1 can reduce the adverse effect of the lower level protocol packet loss in the radio network on the higher level protocol (RTP), thereby enabling the transmission/reception of the data adaptable to the error conditions of the networks.

Embodiment 2

Although the foregoing embodiment 1 handles the system that decides the packet length using the error conditions of the networks 1 and 2 in their entirety, the present embodiment 2 handles a system that decides the packet length by using the error conditions of the networks 1 and 2 independently.

Figure 11:
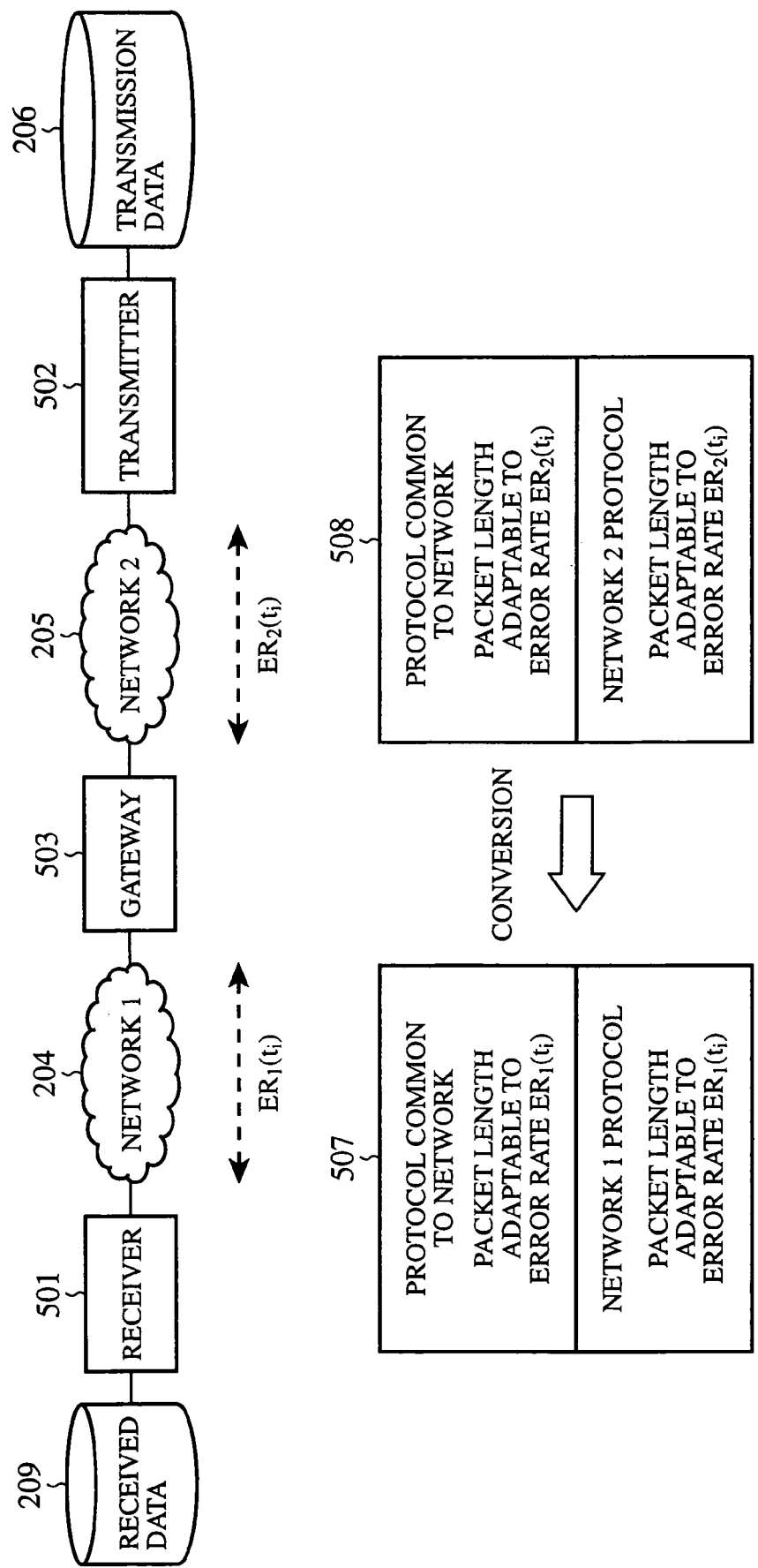
FIG. 11 is a schematic diagram showing a basic configuration of a data transceiver system of an embodiment 2 in accordance with the present invention.

FIG. 11 is a schematic diagram showing a basic configuration of the data transceiver system of an embodiment 2 in accordance with the present invention, which carries out the data transmission/reception via the two networks with different characteristics. In FIG. 11, the reference numeral 501 designates a data receiver (shortened to "receiver" in the drawing), 502 designates a data transmitter (shortened to "transmitter" in the drawing), 503 designates a gateway, 204 designates the network 1, 205 designates the network 2, 206 designates the transmission data, 507 designates a protocol stack in the network 1, 508 designates a protocol stack in the network 2, and 209 designates the received data.

The operation of the data transceiver system of the present embodiment 2 as shown in FIG. 11 will be described. The data receiver 501 receives the received data 206 from the data transmitter 502 via the network 1 (204) and network 2 (205) with different characteristics. The network 1 and network 2 have an error rate varying depending on time or a state and position of the data receiver 501. The error rates in the network 1 (204) and network 2 (205) for the data receiver 501 at time ti are represented by ER1(ti) and ER2(ti), respectively.

The transmission data 206 is transferred between the data transmitter 502 and the data receiver 501 using the protocol common to the networks described in the protocol stacks 507 and 508 as the higher level protocol, and is transferred in the network 1 using the network 1 protocol described in the protocol stack 507 as the lower level protocol, and in the network 2 using the network 2 protocol described in the protocol stack 508 as the lower level protocol. As for the lower level protocol conversion between the network 1 and network 2 and the packet length conversion of the higher level protocol, the gateway 503 carries out.

Figure 12:
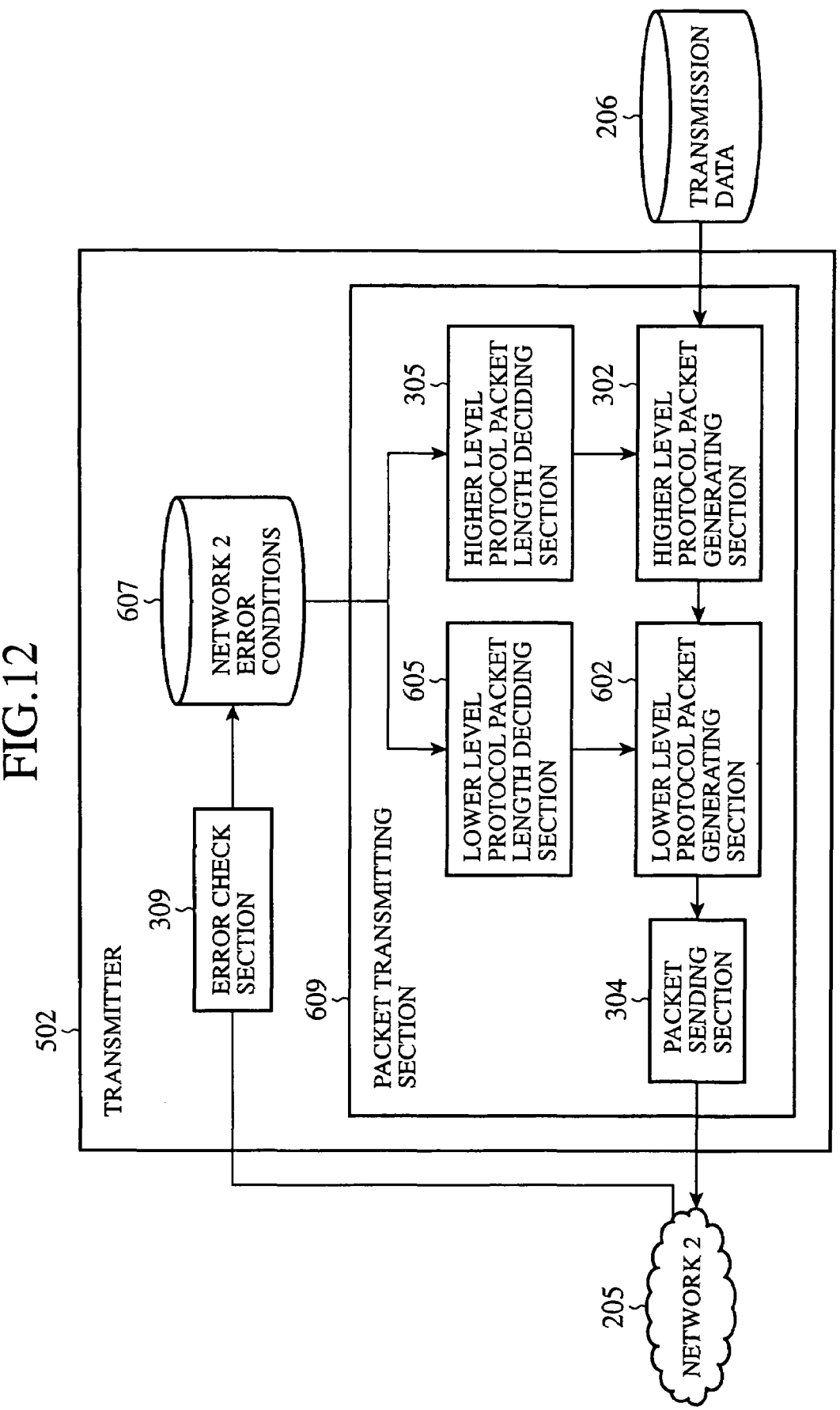
FIG. 12 is a block diagram showing a detailed configuration of the data transmitter 502 of the embodiment 2 as shown in FIG. 11.

FIG. 12 is a block diagram showing a detailed configuration of the data transmitter 502 of the embodiment 2 as shown in FIG. 11. In FIG. 12, the reference numeral 302 designates the higher level protocol packet generating section, 602 designates a lower level protocol packet generating section, 304 designates the packet sending section, 305 designates the higher level protocol packet length deciding section, 605 designates a lower level protocol packet length deciding section, 309 designates the error check section, 607 designates network 2 error conditions, and 206 designates the transmission data.

The operation of the data transmitter 502 of the embodiment 2 as shown in FIG. 12 will be described. The higher level protocol packet generating section 302 generates a packet of the higher level protocol to transmit the transmission data 206.

As for the length of the packet of the higher level protocol, the higher level protocol packet length deciding section 305 decides it at a packet length adaptable to the error conditions with reference to the data about the network 2 error conditions 607. The packet of the higher level protocol generated is supplied to the lower level protocol packet generating section 602. On the other hand, as for the packet length of the lower level protocol, the lower level protocol packet length deciding section 605 decides it at a packet length adaptable to the error conditions with reference to the data about the network 2 error conditions 607.

The configurations of the higher level and lower level protocol packet length deciding sections are the same as the configuration of the higher level protocol packet length deciding section 305 as shown in FIG. 6. The packet generated by the lower level protocol packet generating section 602 is supplied to the packet sending section 304 to be transferred to the network 2 (205). As for the network 2 error conditions 607, the error check section 309 collects the error conditions of the network 2, and stores in the network 2 error conditions 607.

Figure 13:
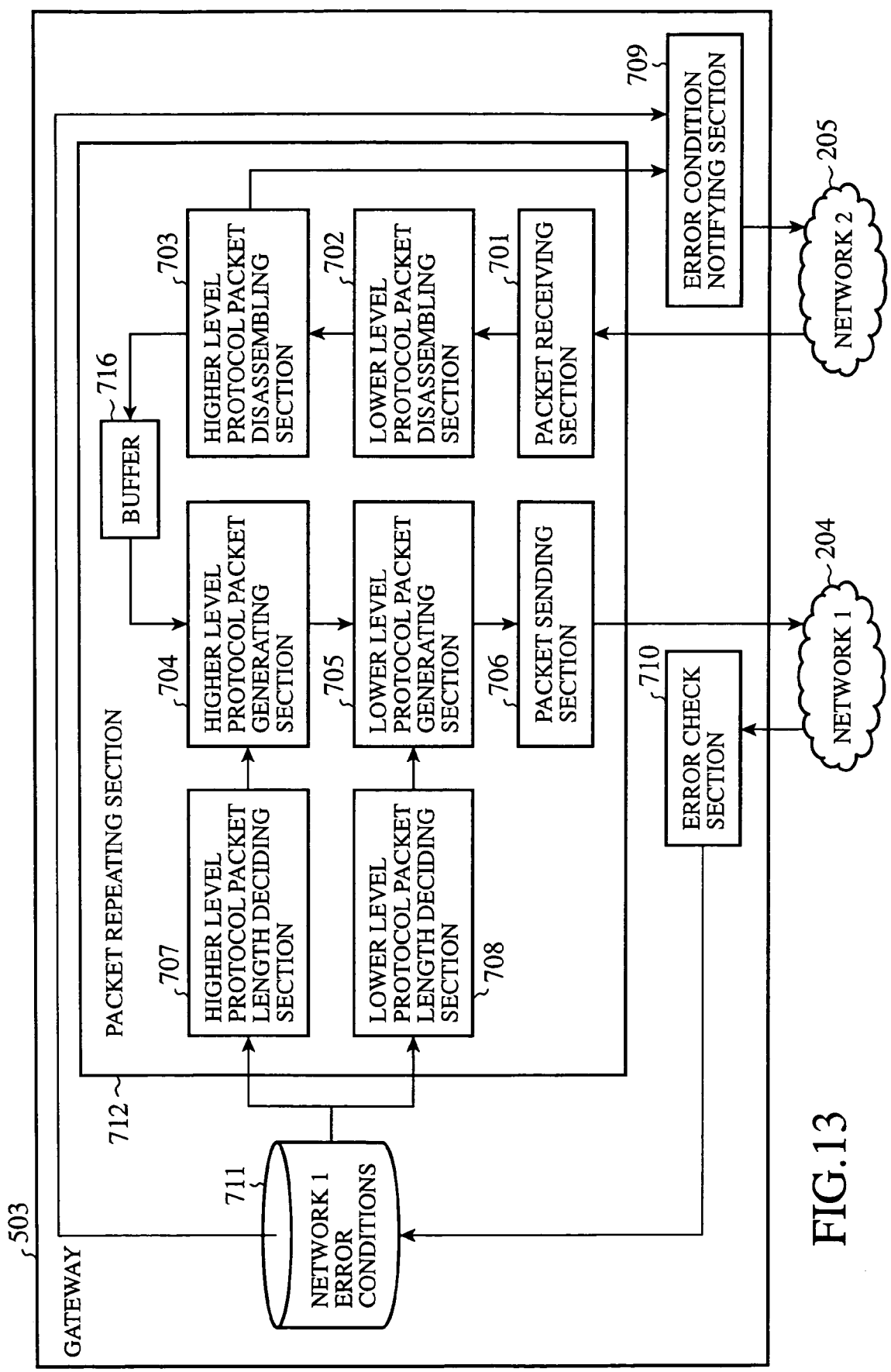
FIG. 13 is a block diagram showing a detailed configuration of the gateway 503 of the embodiment 2 as shown in FIG. 11.

FIG. 13 is a block diagram showing a detailed configuration of the gateway 503 of the embodiment 2 as shown in FIG. 11. In FIG. 13, the reference numeral 701 designates a packet receiving section, 702 designates a lower level protocol packet disassembling section, 703 designates a higher level protocol packet disassembling section, 704 designates a higher level protocol packet generating section, 705 designates a lower level protocol packet generating section, 706 designates a packet sending section, 707 designates a higher level protocol packet length deciding section, 708 designates a lower level protocol packet length deciding section, 709 designates an error condition notifying section, 710 designates an error check section, 711 designates network 1 error conditions, 712 designates a packet repeating section, 503 designates the gateway, 204 designates the network 1, 205 designates the network 2, and 716 designates a buffer.

The operation of the gateway 503 of the embodiment 2 as shown in FIG. 13 will be described. The packet receiving section 701 captures from the network 2 (205) the packet received from the data transmitter 502, and supplies it to the lower level protocol packet disassembling section 702. The lower level protocol packet disassembling section 702 disassembles the lower level protocol of the packet, and supplies the packet to the higher level protocol packet disassembling section 703. The higher level protocol disassembling section 703 disassembles the higher level protocol, and temporarily stores the data into the buffer 716 consisting of a FIFO.

The higher level protocol packet generating section 704 reads the transmission data from the buffer 716, generates the higher level protocol packet, and supplies it to the lower level protocol packet generating section 705. As for the packet length of the higher level protocol, the higher level protocol packet length deciding section 707 decides it with reference to the network 1 error conditions 711.

The lower level protocol packet generating section 705 generates a lower level protocol packet for the network 1 from the higher level protocol packet supplied from the higher level protocol packet generating section 704. As for the packet length of the lower level protocol, the lower level protocol packet length deciding section (708) decides it with reference to the network 1 error conditions 711. The configurations of the higher level and lower level protocol packet length deciding sections 707 and 708 are assumed to be the same as the configuration of the higher level protocol packet length deciding section 305 as shown in FIG. 6.

Here, when the RTP packet as illustrated in FIG. 8 is used as the common higher level protocol, and the packet length is changed at the gateway (503), it is necessary to reassign the sequence number. Assume that even if there is a packet lost in the network 2, the RTP packets to be generated anew are sequentially numbered with excluding the portions lost.

The packet generated by the lower level protocol packet generating section 705 is supplied to the packet sending section 706 to be sent out to the network 1 (204). Then, the data receiver 501 of the present embodiment 2 as shown in FIG. 11 receives the data via the network 1 (204). The data receiver 501 has the same configuration and operates in the same manner as the data receiver 201 of the foregoing embodiment 1 as shown in FIG. 7. Thus, the error condition notifying section 405 notifies the gateway 503 of the error conditions.

The notification of the error conditions is transmitted from the data receiver 501 to the gateway 503. The gateway 503 merges the error conditions at the data receiver 501 due to the network 1 (204) with the error conditions at the gateway 503 due to the network 2 (205), and supplies the resultant error conditions to the data transmitter 502.

More specifically, in the gateway 503, the error check section 710 receives the error condition information between the gateway 503 and the data receiver 501 in the network 1, and stores it as the network 1 error conditions 711. In addition, the error condition notifying section 709 of the gateway 503 captures the fraction of packets lost and the number of packets lost obtained as a result of the analysis by the higher level protocol packet disassembling section 703 as well as the error condition information in the network 1 from the network 1 error conditions 711, and transmits these error conditions to the data transmitter 502 via the network 2 (205).

For example, consider the transmission to the data transmitter 502 using the RTCP packet as illustrated in FIG. 9. In this case, "the reception error conditions of the receiver" indicates the error condition of the network 1, and "the reception error conditions of the gateway" indicates the error condition of the network 2.

Thus, the present embodiment 2 is configured such that the gateway 503 detects the error conditions of the networks 1 and 2, and controls the packet lengths of the common higher level protocol and lower level protocol when transmitting data from the gateway 503 to the data receiver 501, and that the gateway 503 transmits the error conditions to the data transmitter 502 so that the data transmitter 502 controls the packet lengths of the common higher level protocol and lower level protocol when transmitting data to the gateway 503. Accordingly, as for the network 1 from the gateway 503 to the data receiver 501, the packet with the length adaptable to the error conditions of the network 1 is transmitted through the network 1 for both the common higher level protocol and lower level protocol. In addition, as for the network 2 from the data transmitter 502 to the gateway 503, the packet with the length adaptable to the error conditions not only of the network 2, but also of the network 1, is transmitted through the network 2 for both the common higher level protocol and lower level protocol.

For example, consider a video transceiver system in which the network 1 is a radio network and the network 2 is a wired network, the lower level protocols differ in the radio protocol and wired protocol, the higher level uses the RTP/UDP/IP as the common protocol, and the error conditions between the data receiver 501 and the data transmitter 502 are transmitted according to the RTCP/UDP/IP. In this case, although the lower level protocol inherent in the radio network is used to send a short packet substantially suitable for the radio network with a greater number errors, the packet length is still more variable in accordance with the error conditions of the network 1.

Although the protocol inherent in the wired network of the network 2 employs the packet length of the higher level protocol to transmit/receive data efficiently, the packet length of the higher level protocol is also variable in accordance with the error conditions of the network 2.

Thus, the gateway 503 converts the RTP packet length based on the common protocol according to the error conditions of the network 1 and network 2 so that the network 2 can use a long packet to carry out efficient transmission because of a smaller number of errors, and the network 1 can use a short packet to reduce the adverse effect of the error because of a greater number of errors.

Although the foregoing description is made by way of example in which the data transmitter 502 transmits data to the data receiver 501 via the single gateway 503, the present invention is not limited to such a configuration. For example, it is also applicable to a case where the data transmitter 502 transmits data to the data receiver 501 through a plurality of gateway. In this case, the packet repeating section of each gateway generates the error condition data about the network to be repeated, and transmits it to the party gateway, thereby enabling the transmission/reception with the packet length corresponding to the error conditions.

Embodiment 3

In the foregoing embodiments 1 and 2, the data receiver and gateway each have a means for notifying their own network error conditions. In contrast, the present embodiment 3 handles a system capable of capturing the error conditions without such a means for notifying the error conditions of the network.

Figure 14:
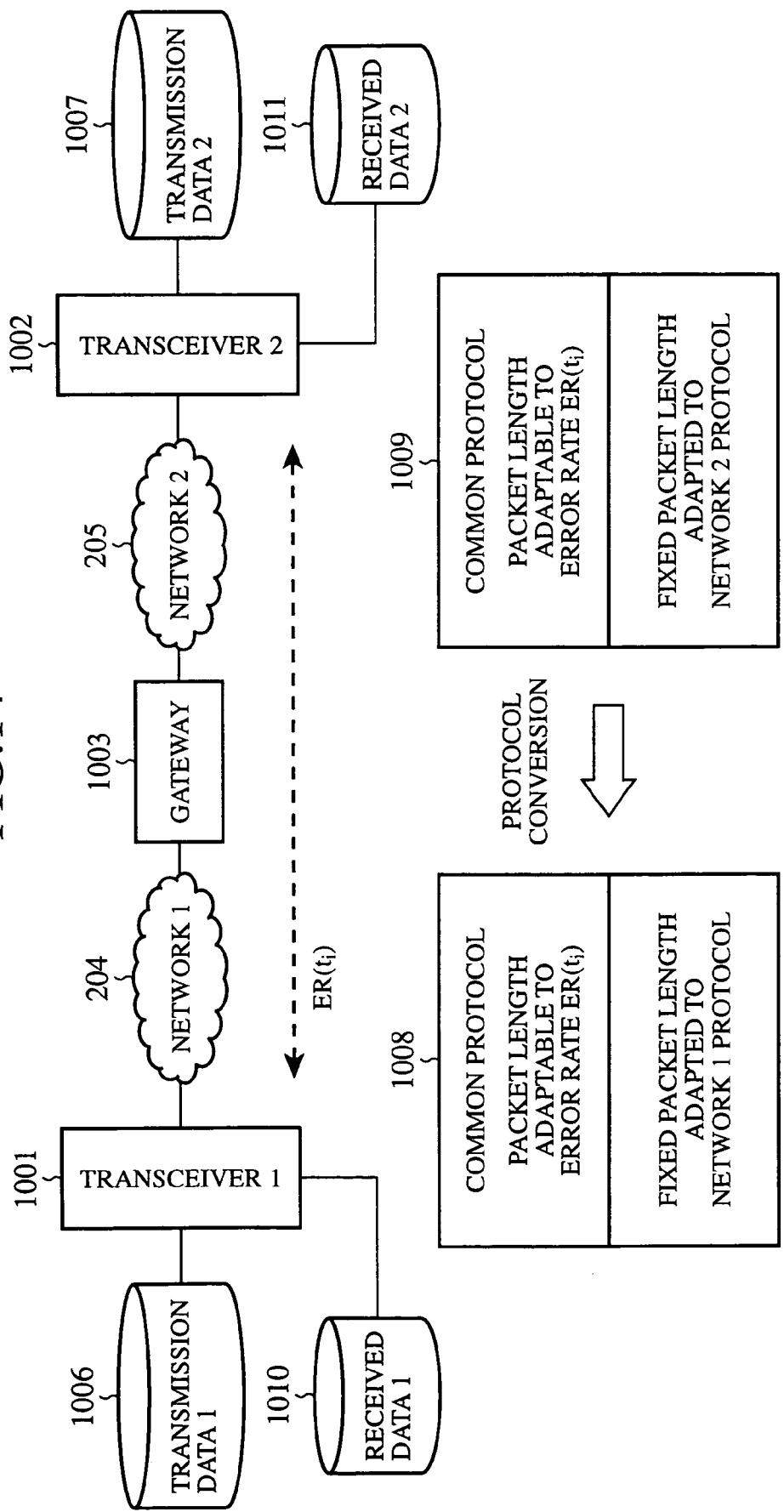
FIG. 14 is a schematic diagram showing a basic configuration of a data transceiver system of an embodiment 3 in accordance with the present invention.

FIG. 14 is a schematic diagram showing a basic configuration of a data transceiver system of an embodiment 3 in accordance with the present invention. In FIG. 14, the reference numeral 1001 designates a transceiver 1, 1002 designates a transceiver 2, 1003 designates a gateway, 204 designates the network 1, 205 designates the network 2, 1006 designates transmission data 1, 1007 designates transmission data 2, 1008 designates a protocol stack of the network 1, 1009 designates a protocol stack of the network 2, 1010 designates received data 1, and 1011 designates received data 2. In addition, ER(ti) is the total error rate of the network 1 (204) and network 2 (205) for the transceiver 1 (1001) at time ti.

The operation of the data transceiver system of the embodiment 3 as shown in FIG. 14 will be described. The transceiver 1 (1001) transmits the transmission data 1 (1006) to the transceiver 2 (1002), and receives the received data 1 (1010) from the transceiver 2 (1002). Likewise, the transceiver 2 (1002) transmits the transmission data 2 (1007) to the transceiver 1 (1001), and receives the received data 2 (1011) from the transceiver 1 (1001).

Figure 15:
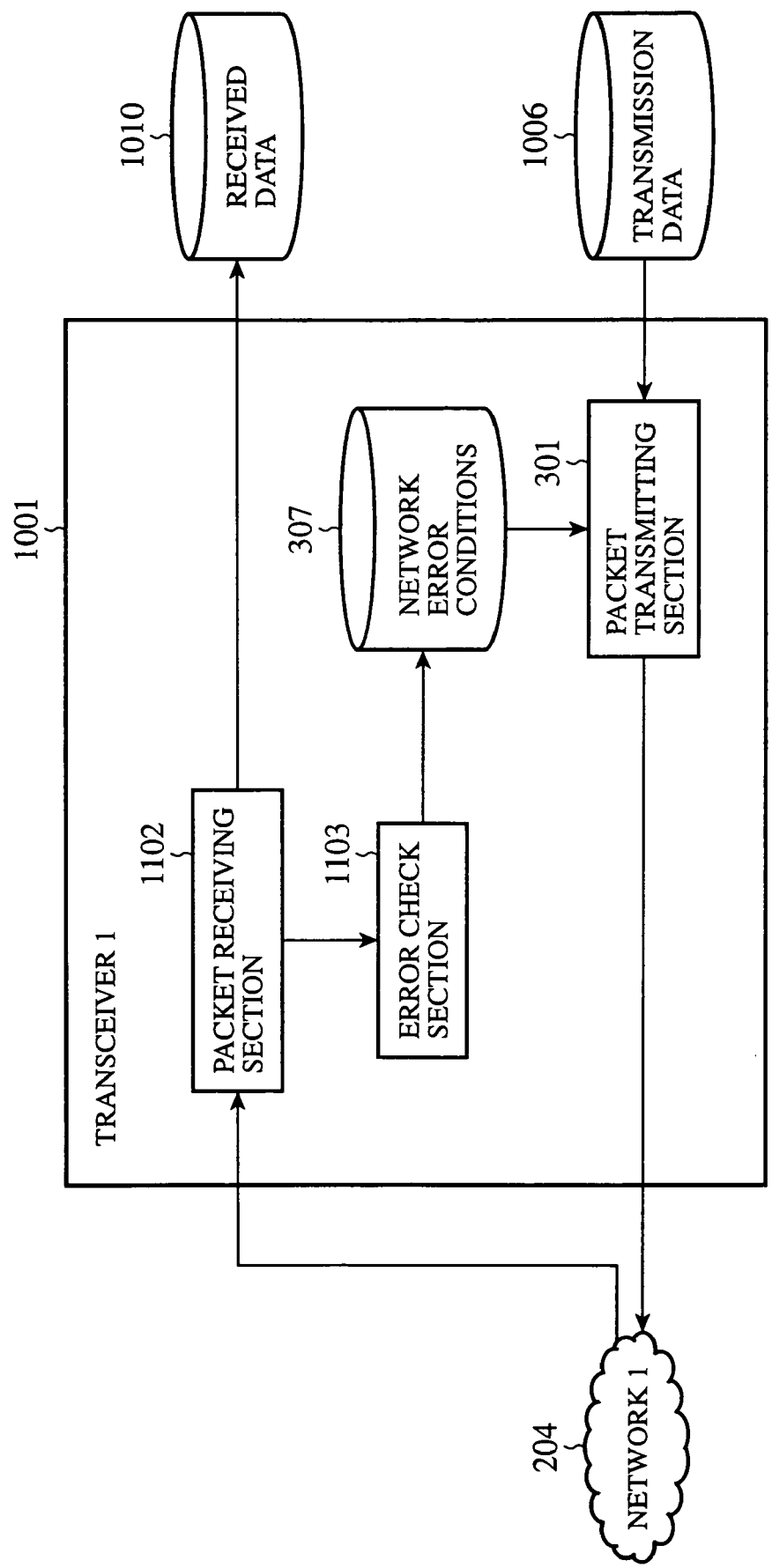
FIG. 15 is a block diagram showing a detailed configuration of the transceivers 1 and 2 of the embodiment 3 as shown in FIG. 14.

FIG. 15 is a block diagram showing a detailed configuration of the transceiver 1 (or 2) of the embodiment 3 as shown in FIG. 14. In FIG. 15, the reference numeral 301 designates a packet transmitting section similar to the packet transmitting section 609 of the data transmitter 502 of the embodiment 2 as shown in FIG. 12; 1102 designates a packet receiving section similar to the packet receiving section 404 of the data receiver 201 of the embodiment 1 as shown in FIG. 7; 1103 designates an error check section; 307 designates the network error conditions; 1010 designates received data; 1006 designates transmission data; 1001 designates the transceiver; and 204 designates the network 1.

The operation of the transceiver 1 (or 2) of the embodiment 3 as shown in FIG. 15 will be described. The transceiver 1 (1001) performs bidirectional data communication with the party transceiver 2 (1002). The network routes of the transmission/reception are assumed to use the same network. Thus, as for the example of FIG. 14, the network 1 (204) and network 2 (205) are used.

At the transceiver 1 (1001), its packet receiving section (1102), receiving and disassembling a packet, extracts the loss conditions of a packet in the same manner as the packet receiving section 404 of the data receiver 201 of the embodiment 1 as shown in FIG. 7, and supplies the loss conditions to the error check section 1103. The error check section 1103 generates the network error condition data from the packet loss conditions received, and stores the data in the network error conditions 307.

On the transmitting side, on the other hand, the packet transmitting section 301 decides the packet length of the higher level protocol and that of the lower level protocol with reference to the network error conditions 307 in the same manner as the packet transmitting section 609 of the data transmitter 502 in the embodiment 2 as shown in FIG. 12, and transmits the packet.

Thus, the present embodiment 3 is configured such that the transceiver (1001) or (1002), when transmitting data, decides the packet length of the higher level protocol and that of the lower level protocol with reference to the network error conditions 307 in the same manner as the packet transmitting section 609 of the data transmitter 502 in the foregoing embodiment 2 as shown in FIG. 12, and transmits the packet, and when receiving the data, extracts the loss conditions of the packet when receiving and disassembling the packet in the same manner as the packet receiving section 404 of the data receiver 201 of the foregoing embodiment 1 as shown in FIG. 7, and that the error check section 1103 generates the network error condition data from the packet loss conditions received, and stores the data in the network error conditions 301. As a result, even the system without the means for notifying the error conditions of the network can carry out the data transmission with the packet length corresponding to the network conditions by analyzing the network error conditions generated from the conditions of the bidirectional packet transmission and reception.

Embodiment 4

As for the packet length of the higher level protocol, the foregoing embodiments 1–3 each decide the appropriate packet length with reference to the error conditions of the networks. In contrast, the present embodiment 4 decides the packet length when transmitting media data such as video or audio information that imposes conditions on dividing a packet.

Figure 16:
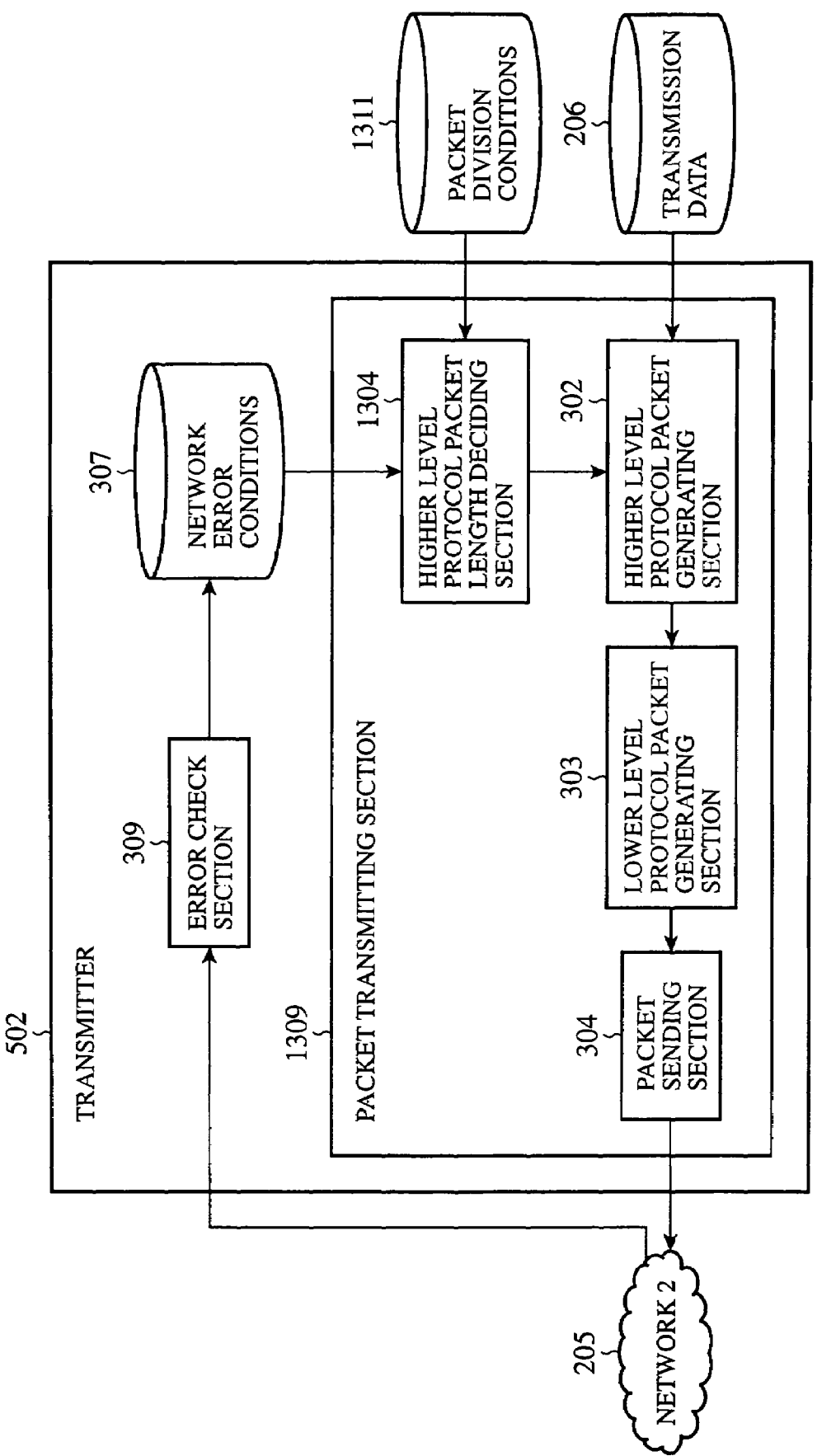
FIG. 16 is a block diagram showing a detailed configuration of the data transmitter 502 of an embodiment 4 in accordance with the present invention.

FIG. 16 is a block diagram showing a detailed configuration of the data transmitter 502 of the present embodiment 4. The data transmitter 502 of the present embodiment 4 is characterized by adding packet division conditions 1311 to the data transmitter 202 of the embodiment 1 as shown in FIG. 4.

In FIG. 16, the reference numeral 302 designates the higher level protocol packet generating section, 303 designates the lower level protocol packet generating section, 304 designates the packet sending section, 1304 designates a higher level protocol packet length deciding section, 309 designates the error check section, 307 designates the network 2 error conditions, 206 designates the transmission data, 1309 designates a packet transmitting section, and 205 designates the network 2. These components correspond to those of the data transmitter 502 of the embodiment 2 as shown in FIG. 12. The reference numeral 1311 designates the packet division conditions.

The operation of the data transmitter 502 of the embodiment 4 as shown in FIG. 16 will be described. The higher level protocol packet length deciding section 1304 refers to the packet division conditions 1311 to decide the packet length to be transmitted. The packet division conditions include the structure and characteristic information of the data transmitted, and offers the reference to decide the length of the packet.

FIG. 17 illustrates an example that transmits MPEG-4 video data according to the RTP in the present embodiment 4. In FIG. 17, reference numerals 1601–1606 represent an MPEG-4 video data structure: 1601 and 1602 each designate a VOP (Video Object Plane) representing a video frame. The VOP can be composed of a plurality of video packets, which are designated by the reference numerals 1603–1606. It is preferable that the MPEG-4 video data with such a structure be packetized on a VOP by VOP basis or VP by VP basis. Thus, the packet division conditions 1311 specify the packet division conditions on the VOP or VP (video packet) basis. In this way, the packet length can be divided into a length more suitable for the error conditions under the control of the packet division conditions 1311.

In FIG. 17, again, reference numerals 1607–1610 each designate a packet structure: 1607 and 1608 represent the case of structuring the packet on a VOP by VOP basis under the control of the packet division conditions 1311; and 1609 and 1610 represent the case of structuring the packet on a VP by VP basis under the control of the packet division conditions 1311.

Thus, the present embodiment 4 is configured such that it includes the packet division conditions 1311 that store the information on the structure and characteristics of the data in advance, and that when the higher level protocol packet length deciding section 1304 decides the packet length, it refers to the packet division conditions 1311 and decides the higher level protocol packet length. As a result, the present embodiment can vary the packet length in accordance with the characteristics and structure of the data to be transmitted.

Although the present embodiment 4 is described by way of example including the packet division conditions 1311 added to the data transmitter 202 of the embodiment 1 shown in FIG. 4, the present invention is not limited to the configuration. For example, it is obvious that the packet division conditions 1311 can be added to the data transmitter 502 of the embodiment 2 shown in FIG. 12 so that the higher level protocol packet length deciding section 305 refers to the packet division conditions 1311 to decide the higher level protocol packet length; that the packet division conditions 1311 can be added to the gateway 503 of the embodiment 2 as shown in FIG. 13 so that the higher level protocol packet length deciding section 707 refers to them when it decides the higher level protocol packet length of the packet to be transmitted to the network 1 (204); or that the packet division conditions 1311 can be added to the transceiver 1001 of the embodiment 3 shown in FIG. 15 so that the higher level protocol packet length deciding section refers to them when it decides the higher level protocol packet length.

INDUSTRIAL APPLICABILITY

As described above, even if the transceivers carry out the data communication via the networks whose error conditions are different, the data transmitter in accordance with the present invention can achieve the data communication adaptable to the changes in the error conditions.

What is claimed is:

1. A data transmitter for carrying out data communication with a data receiver via a plurality of networks with different characteristics using a higher level protocol common to the plurality of networks and a lower level protocol inherent in each of the plurality of networks, said data transmitter is characterized by:

receiving error occurrence conditions in the networks from said data receiver, and variably controlling a packet length of the higher level protocol common to the plurality of networks in response to the error occurrence conditions in the networks.

2. The data transmitter according to claim 1 characterized in that when it variably controls the packet length of the higher level protocol common to the plurality of networks in response to the error occurrence conditions in the networks, said data transmitter variably adjusts the packet length of the higher level protocol in accordance with to a structure and characteristics of data to be transmitted.

3. A gateway for repeating data communication between a data transmitter and a data receiver via a plurality of networks with different characteristics using a higher level protocol common to the plurality of networks and a lower level protocol inherent in each of the plurality of networks, said gateway is characterized by:

receiving error occurrence conditions in the networks from said data receiver, and variably controlling a packet length of the higher level protocol common to the plurality of networks in response to the error occurrence conditions in the networks.

4. The gateway according to claim 3 characterized in that it variably controls the packet length of the lower level protocol different in each network to a packet length adaptable to the error conditions of each network.

5. The gateway according to claim 3 characterized in that the error occurrence conditions in the networks received from said data receiver include error occurrence conditions in the networks transmitted from another gateway at an interface with another network.

6. The gateway according to claim 4 characterized in that the error occurrence conditions in the networks received from said data receiver include error occurrence conditions in the networks transmitted from another gateway at an interface with another network.

7. A data transceiver for carrying out data communication with another data transceiver via a plurality of networks with different characteristics using a higher level protocol common to the plurality of networks and a lower level protocol inherent in each of the plurality of networks, said data transceiver is characterized by:

extracting error occurrence conditions in the networks when receiving data from said another data transceiver, and variably controlling a packet length of the higher level protocol common to the plurality of networks in response to the error occurrence conditions in the networks extracted.

8. A data communication method of carrying out data communication between a data transmitter and a data receiver via a plurality of networks with different characteristics using a higher level protocol common to the plurality of networks and a lower level protocol inherent in each of the plurality of networks, said data communication method is characterized by:

variably controlling a packet length of the higher level protocol common to the plurality of networks in response to error occurrence conditions in the networks.

* * * * *